Sept. 3, 1929. C. W. COLE 1,726,541
COIN ACTUATED INSURANCE POLICY VENDING MACHINE
Filed March 22, 1927 8 Sheets-Sheet 1
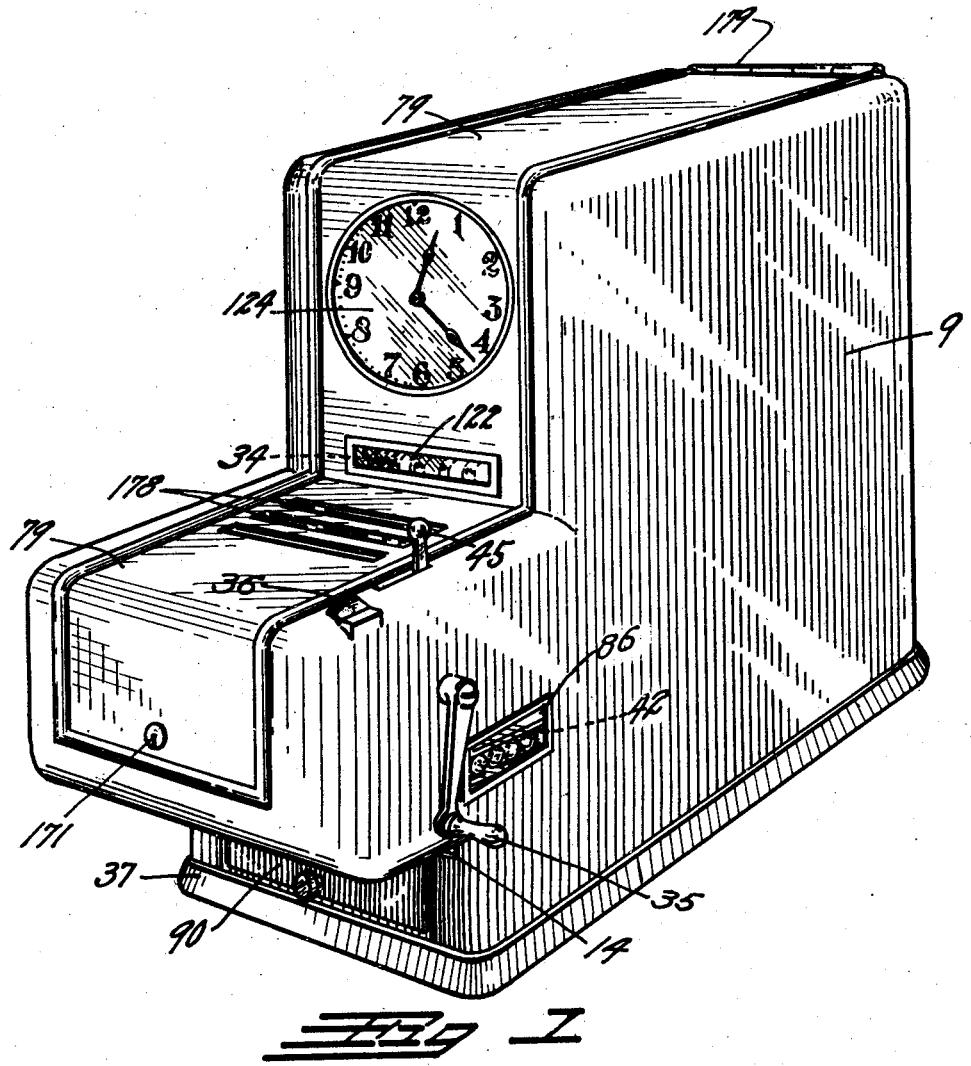
Fig. I
Inventor
CLEVELAND W. COLE
By
Attorney

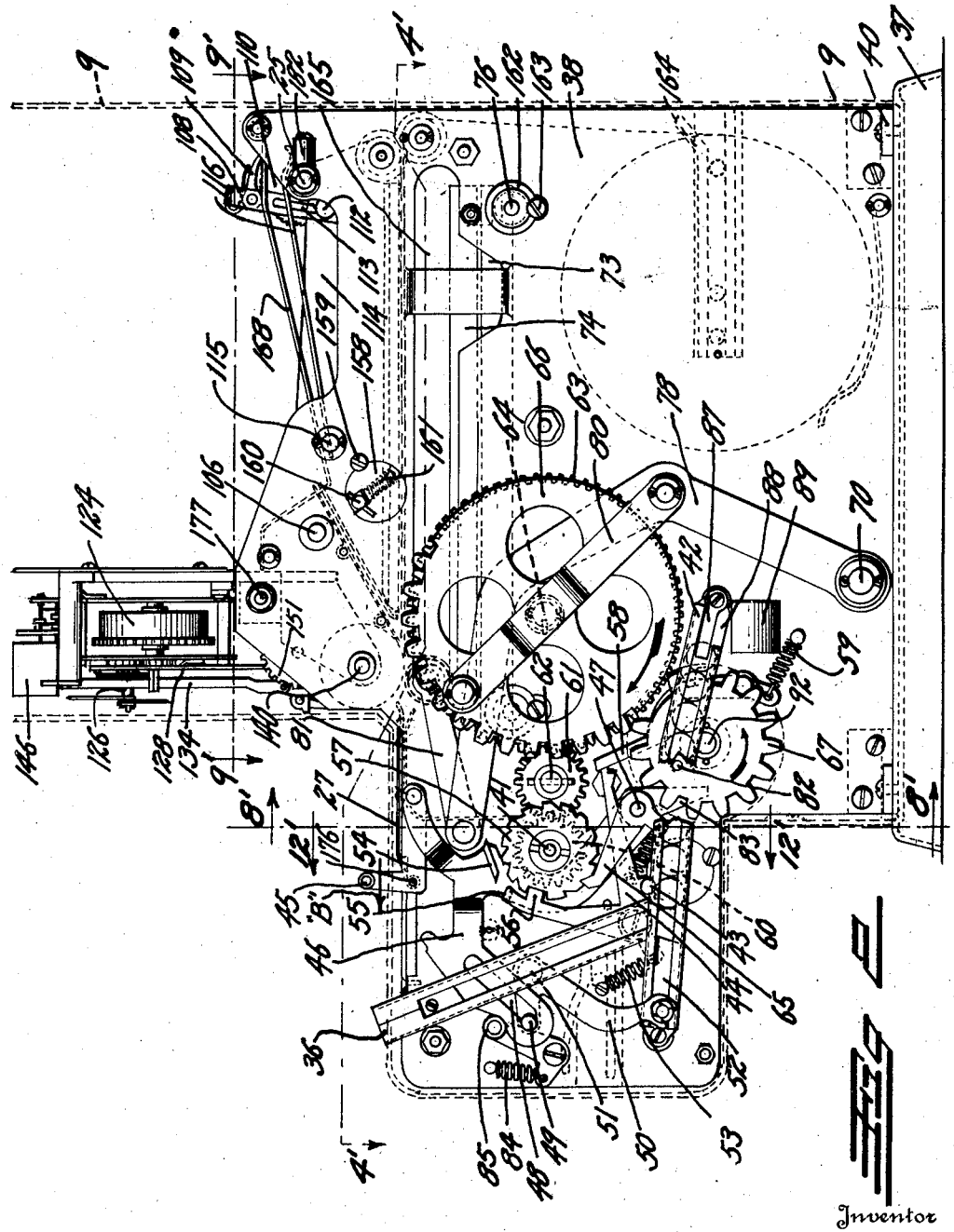

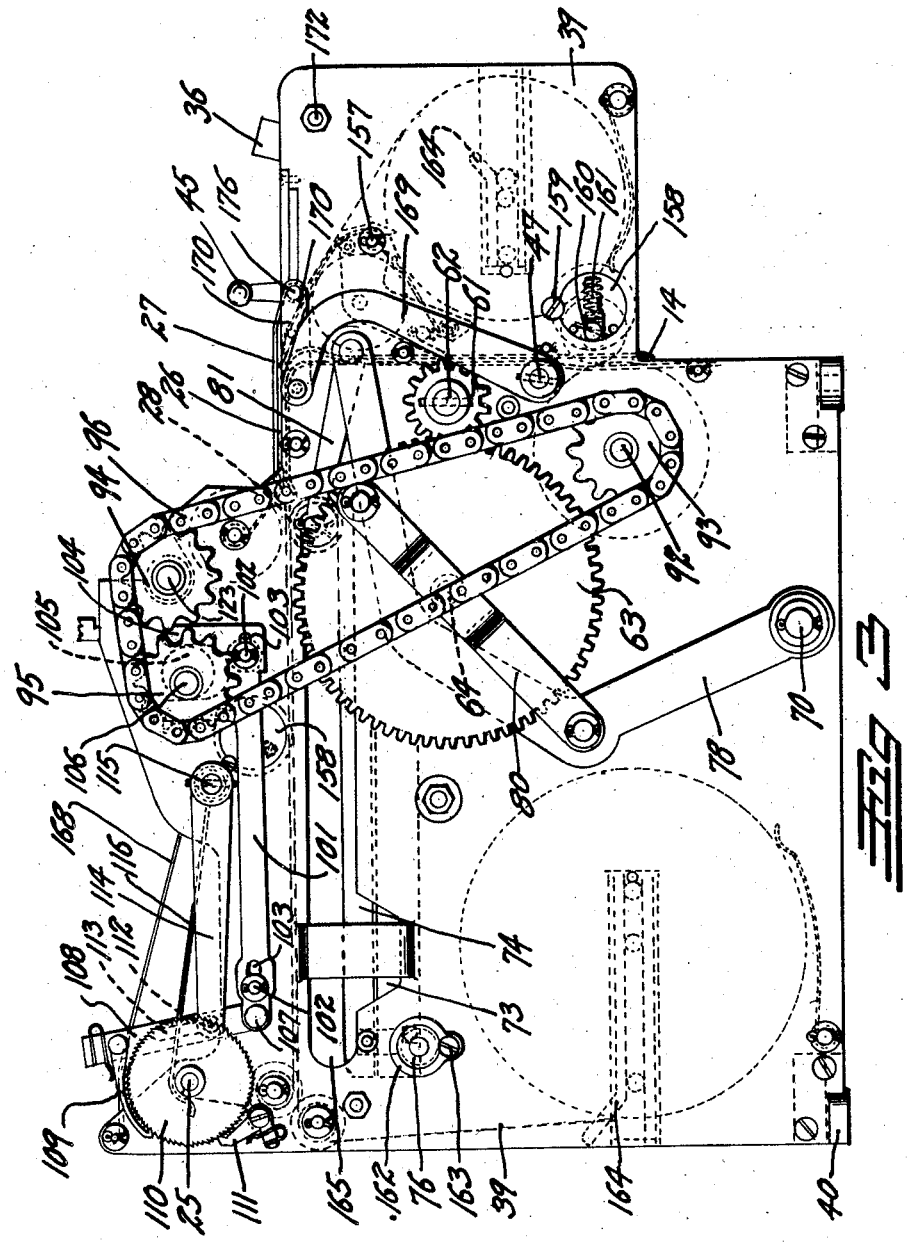

Sept. 3, 1929. C. W. COLE 1,726,541
COIN ACTUATED INSURANCE POLICY VENDING MACHINE
Filed March 22, 1927 8 Sheets-Sheet 4
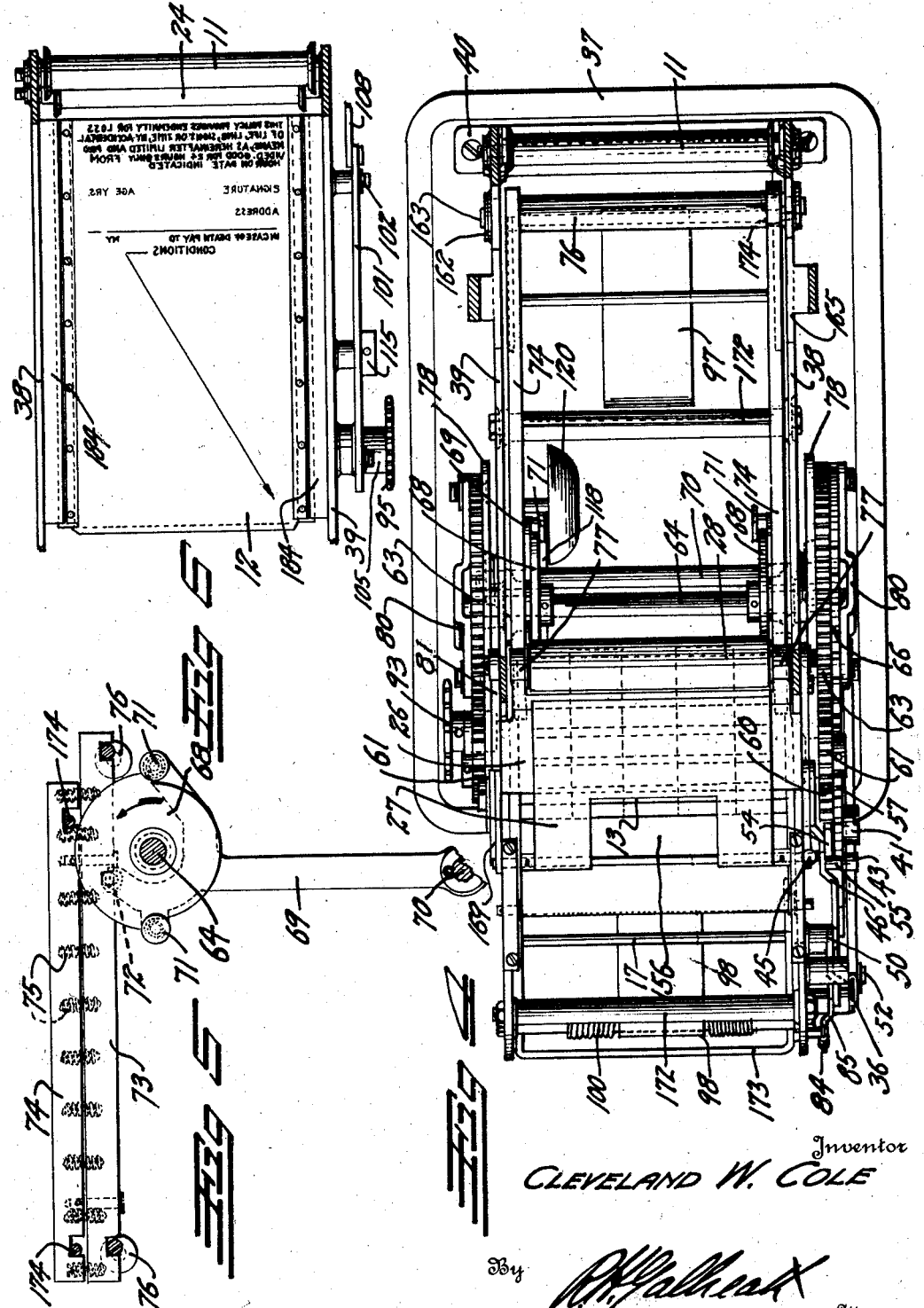

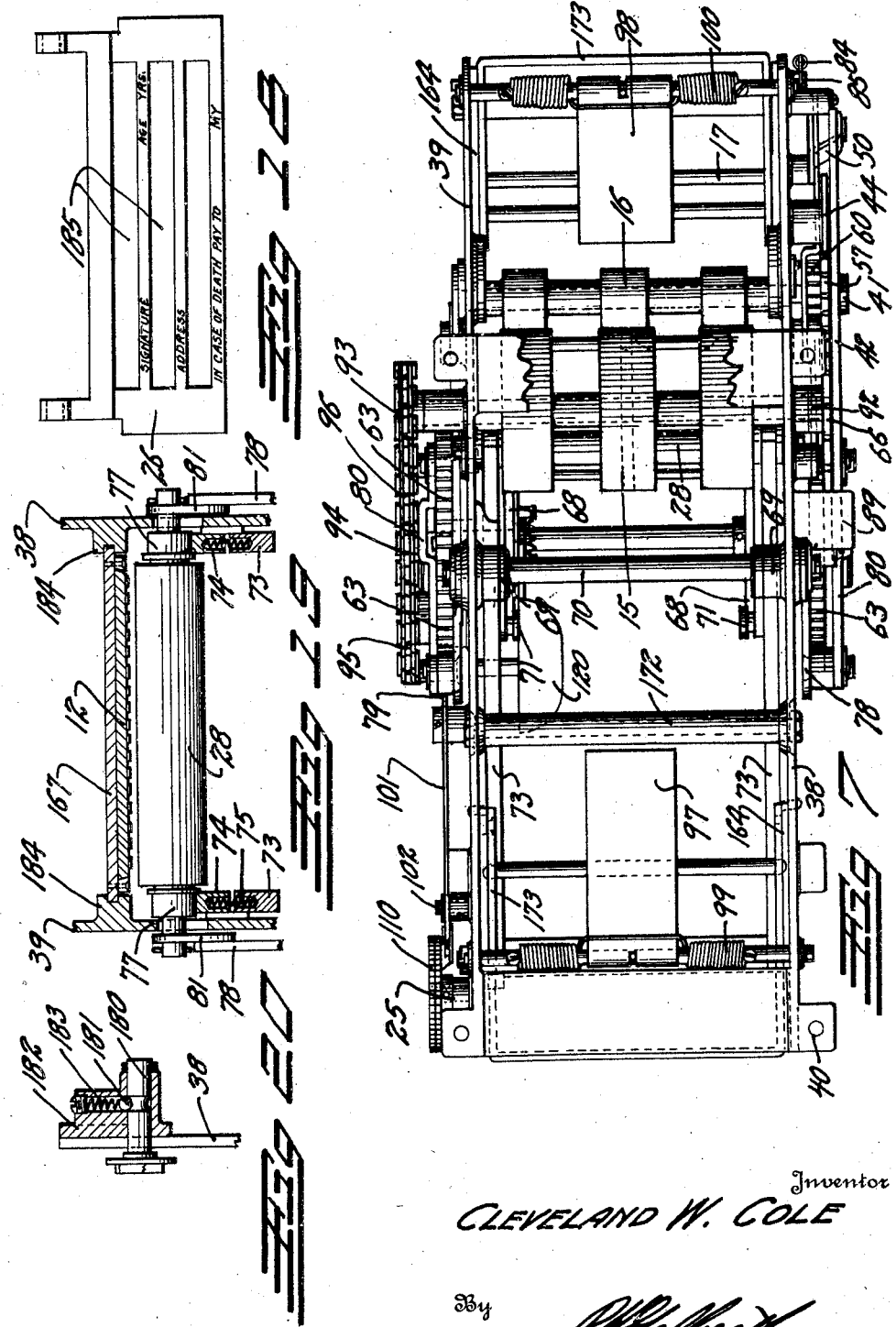

Sept. 3, 1929.　　　　　C. W. COLE　　　　　1,726,541
COIN ACTUATED INSURANCE POLICY VENDING MACHINE
Filed March 22, 1927　　　8 Sheets-Sheet 6
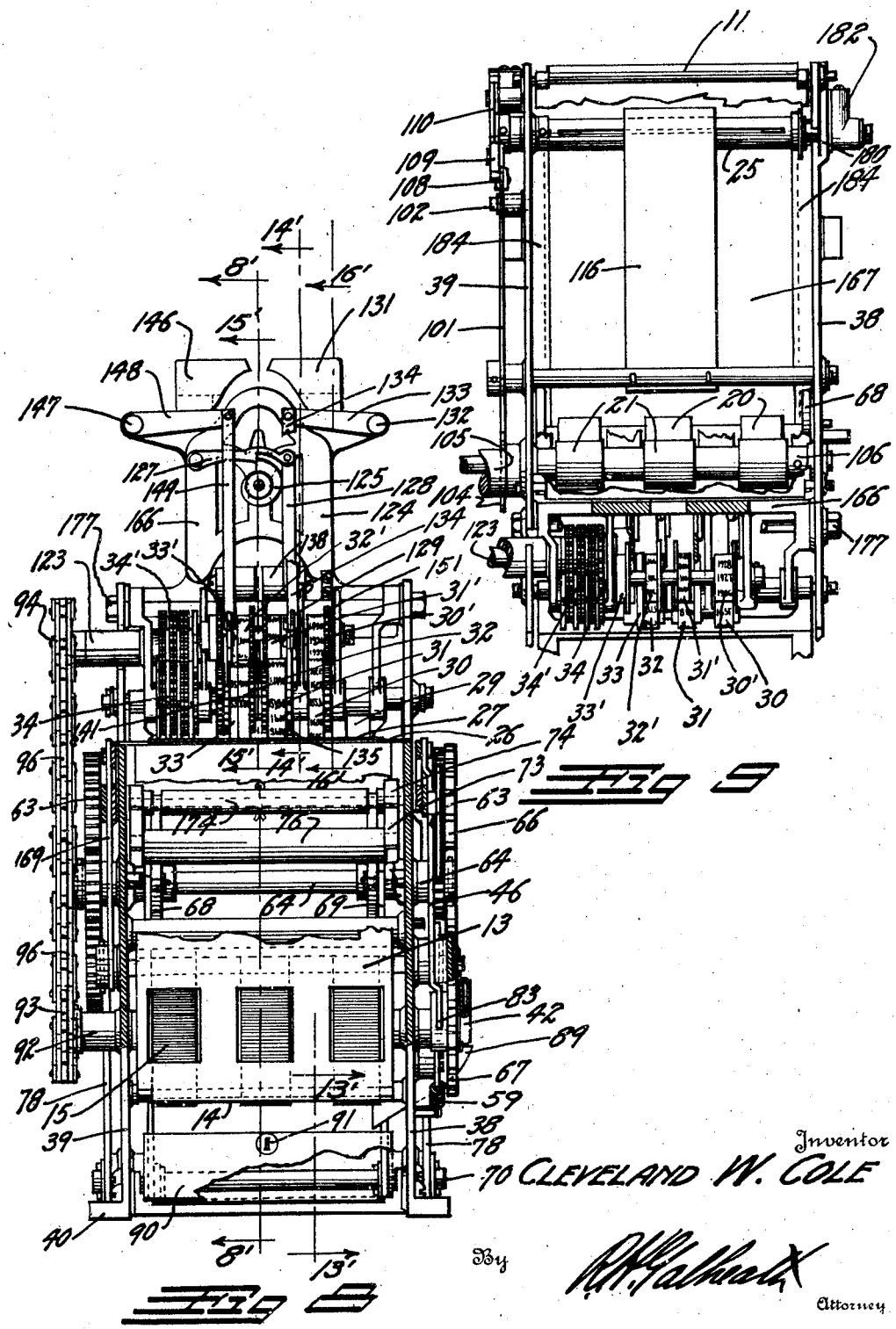
Inventor
CLEVELAND W. COLE
By
Attorney Sept. 3, 1929.　　　　C. W. COLE　　　　1,726,541
COIN ACTUATED INSURANCE POLICY VENDING MACHINE
Filed March 22, 1927　　8 Sheets-Sheet 7
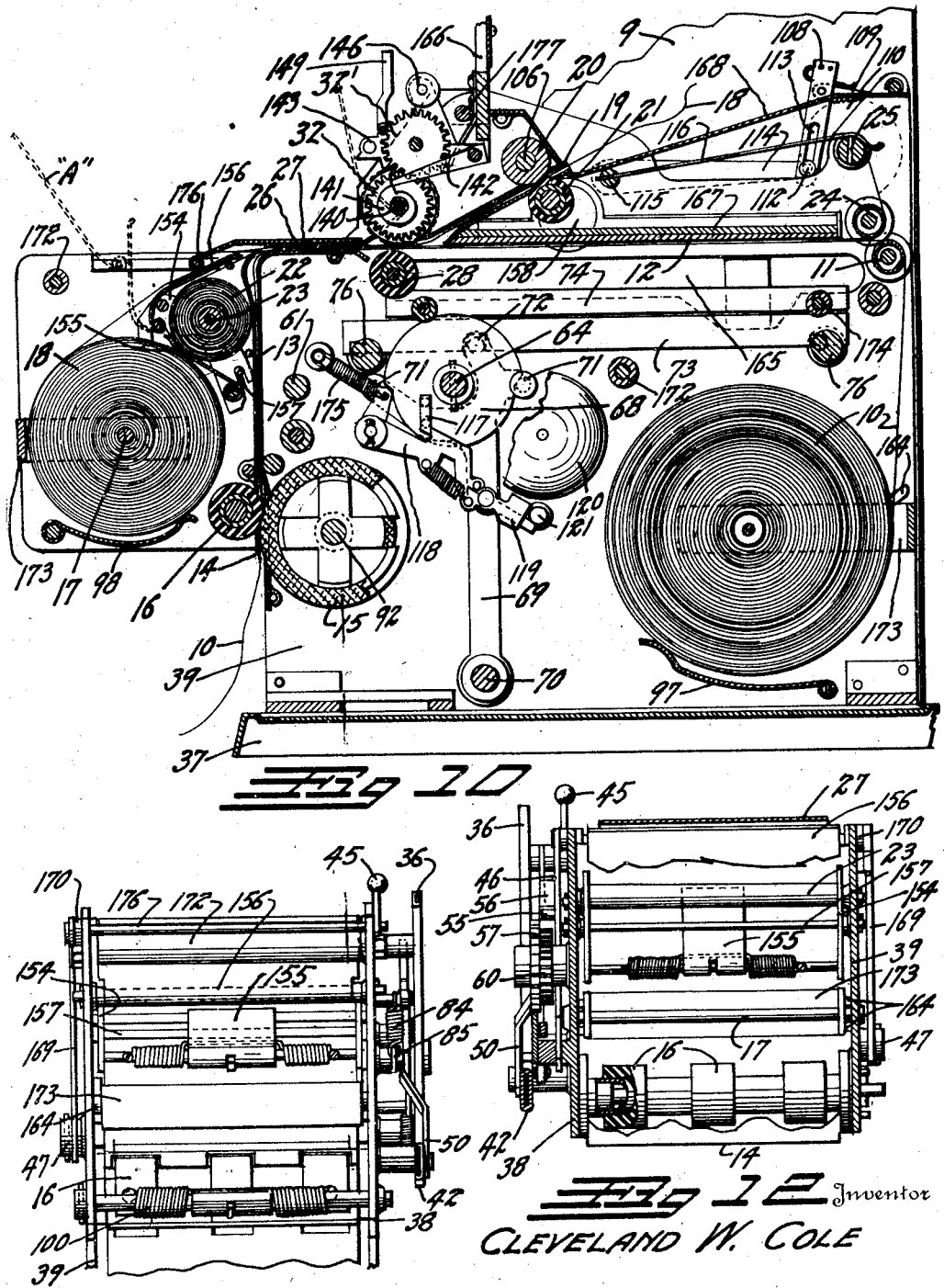
Inventor
CLEVELAND W. COLE
By
Attorney Sept. 3, 1929.   C. W. COLE   1,726,541
COIN ACTUATED INSURANCE POLICY VENDING MACHINE
Filed March 22, 1927   8 Sheets-Sheet 8
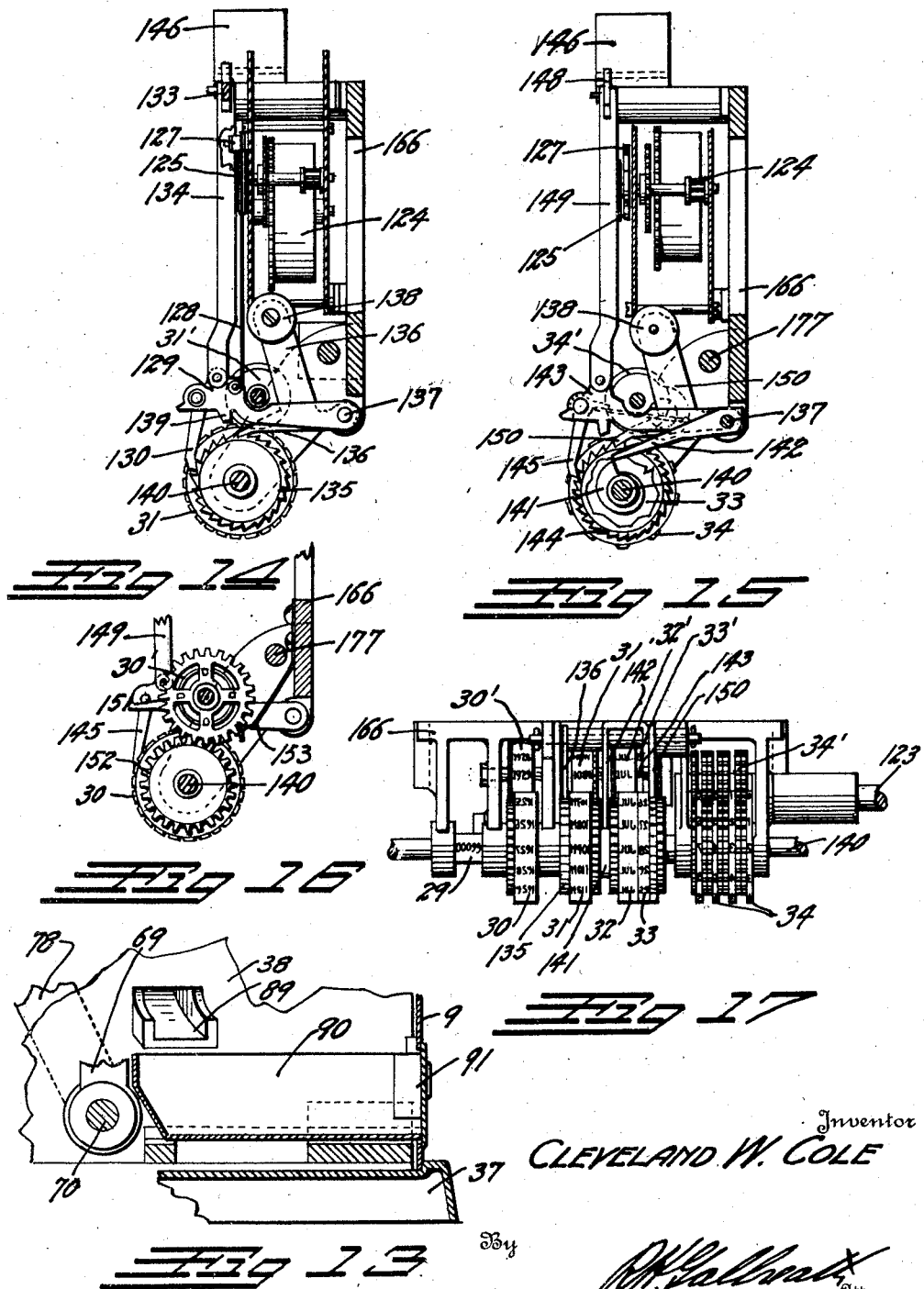

Patented Sept. 3, 1929.

1,726,541

UNITED STATES PATENT OFFICE.

CLEVELAND W. COLE, OF DENVER, COLORADO, ASSIGNOR TO NATIONAL VENDING MACHINE COMPANY, INC., OF DENVER, COLORADO, A CORPORATION OF COLORADO.

COIN-ACTUATED INSURANCE-POLICY-VENDING MACHINE.

Application filed March 22, 1927. Serial No. 177,295.

This invention relates to a device, more particularly a coin-actuated device, for issuing a printed form and retaining a duplicate copy of that form, and, while more particularly designed for use as a coin-operated, insurance policy vender, its field of usefulness is not limited to this service, since it will be valuable in any use in which a machine is desired to issue printed forms in return for a coin deposit.

The principal object of the invention is to provide an efficient mechanism which will be applicable to the vending of insurance policies in return for a coin deposit.

Another object of the invention is to construct a machine for delivering a printed form in which the printing of the form is accomplished in the machine prior to its delivery.

Further objects are:—

To so construct the machine that written matter can be inserted by the depositor, after the deposit of a coin and not before, and in which a duplicate of this information will be retained;

To incorporate a time printing mechanism in a machine of this character which will automatically print the date and hour that the machine is operated upon the delivered form;

To so construct the machine that all of the parts thereof will be freely accessible without disturbance of other parts, and in which the paper rolls and ink ribbon may be quickly and easily replaced;

To provide a date and time printing mechanism which will not employ springs in its operation;

To provide, in a device having an ink ribbon, mechanism which will cause said ribbon to travel at a uniform speed throughout its length regardless of the diameter of the winding roll;

To provide, in a machine of this character, mechanism which will prevent tampering or operating of the machine until a coin of the proper size has been inserted;

To so construct the machine that the last coin inserted will be visible to the exterior of the machine so that spurious coins may be easily detected;

To place the ink ribbon so that it will be used not only for printing the form but also for making a duplicate of the written matter inserted on the form by the operator.

Other objects and advantages reside in the detail construction of the invention, which is designed for simplicity, economy and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a perspective view of the machine as it appears in use. In the remaining views the external housing has been removed.

Fig. 2 is a side elevation of the interior mechanism looking toward the handle side or right side of the machine. The position of the external housing is indicated in broken line in this view.

Fig. 3 is a similar view looking toward the opposite or left side of the machine.

Fig. 4 is a horizontal section taken on the line 4—4, Fig. 2, looking downwardly.

Fig. 5 is a detail view illustrating the impression roller, track-operating, mechanism.

Fig. 6 is a detail view looking upwardly at the type plate employed for printing the form.

Fig. 7 is a bottom view, looking upwardly, of the entire mechanism above the base plate.

Fig. 8 is a vertical cross section, taken on the line 8'—8', Fig. 2.

Fig. 9 is a horizontal section, taken on the line 9'—9', Fig. 2, looking downwardly.

Fig. 10 is a vertical longitudinal section through the machine, taken on the line 10'—10', Fig. 8.

Fig. 11 is a front elevation of the forwardly projecting part of the machine.

Fig. 12 is a vertical section taken on the line 12'—12', Fig. 2.

Fig. 13 is a fragmentary enlarged section taken on the line 13'—13', Fig. 8, illustrating the money drawer.

Fig. 14 is a vertical section taken on the line 14'—14', Fig. 8, illustrating the operation of the hour printing mechanism.

Fig. 15 is a similar section taken on the line 15'—15', Fig. 8, illustrating the operation of the date printing mechanism.

Fig. 16 is a detail view illustrating the operation of the year printing mechanism.

Fig. 17 is a view looking upwardly at the wheels which print the serial number of the form, date and hour issued, and serial number of the machine.

Fig. 18 is a detail view of the face of the aperture plate illustrating the apertures through which written matter may be inserted on the form.

Fig. 19 is a detail section through the impression roll tracks illustrating the position of the type plate.

Fig. 20 is a detail section through the ribbon reel retaining bearing.

As before stated, there are many uses for this machine. One of the principal uses is the vending of an insurance policy. For the purpose of description in the following specification, the machine will be described as applied to this use.

Briefly, the general functions and structure of the machine are as follows:

The machine is designed to receive a main feed roll of blank paper 10. The paper 10 passes upwardly over a guide roller 11, horizontally under a printing plate 12, thence descends through a channel 13 to the exterior of the machine, where the projecting portion may be severed over a knife edge 14.

The paper 10 is drawn through the machine by a driving roll 15, having knurled faces which engage the paper against a rubber pressure roll 16. The driving roll 15 is secured on a roll shaft 92.

A reel 17 carries a roll of blank duplicate paper 18 which feeds rearwardly through the machine over a portion of the main paper 10 and thence upwardly at an angle through a channel 19 from whence it is discharged into the upper portion of the housing 9 above a sub-floor 168. Duplicate paper 18 is drawn through the machine by a knurled driving roll 20 between which and a rubber pressure roll 21, the paper is engaged in the channel 19.

An ink ribbon or other offsetting medium 22 is carried on a reel 23 at the forward part of the machine and passes rearwardly, first, between the main paper 10 and the duplicate paper 18, thence, after the duplicate paper has entered the channel 19, between the type plate 12 and the main paper 10 and around a ribbon idler 24 to a ribbon winding reel 25.

Immediately above the point where the duplicate paper passes over the main paper 10 an aperture plate 26, see detail Fig. 18, is arranged, through the apertures 185 of which the machine operator may write his name, address, age and the name of the beneficiary of the insurance policy and any other desired matter, upon the duplicate sheet. This matter is impressed by the ink ribbon 22 upon the main paper 10. The aperture plate 26 is covered by means of a pivoted, slidably-mounted, cover plate 27 until the proper coin has been deposited in the machine.

The formal printed matter of an insurance policy, conditions, contract, etc., is carried in relief on the type plate 12 and is printed upon the policy by means of an impression roller 28 which is raised against the paper 10 and rolled across the machine pressing the paper 10 against the ribbon 22 and the latter against the type plate 12.

The policies are for a limited time, usually twenty-four hours, and must be dated, timed and numbered. This is accomplished through the medium of a machine number die 29, year wheel 30, hour wheel 31, month wheel 32, date wheel 33, and policy serial numbering wheels 34. The machine number die 29 is fixed in position and contains the number of that particular machine. The year wheel 30 and month wheel 32 are rotated by hand and set at the beginning of each year and month. The date and hour wheels 33 and 31 are operated by means of a clock work mechanism illustrated in Figs. 14 and 15, to be later described. The policy number wheels are operated direct from the operating mechanism of the machine so as to serially number each policy.

The entire mechanism is operated from an operating handle 35 which is exposed on the outside of the housing 9, and which cannot be operated until the proper coin has been inserted in a coin slot 36.

The detailed operation and construction of the machine will now be described.

The entire mechanism is supported on a base 37 upon which the housing 9 rests and to which two side frames 38 and 39 are secured by means of feet 40 to carry the operating mechanism. The side frames are maintained in spaced relation by means of bolts and separators 172. The operating mechanism is driven from an operating pinion 60 carried on a stud 41 from the side frame 38 and rotated through the medium of the handle 35.

When a coin is deposited in the coin slot 36, it falls to a horizontally inclined coin channel 42. The coin is prevented from rolling downwardly in this channel by striking a coin stop 43 which is indented into the top of the coin channel 42 and is carried on a locking lever 44. To cause the coin to pass the coin stop 43 a cover plate handle 45 is pulled forwardly, in the direction of the arrow "B", Fig. 2. The cover plate handle carries a bar 176 upon which the cover plate 27 is hinged. The movement of the handle 45 is communicated to a cover plate lever 46 which is pivoted on a lever shaft 47. The lever shaft 47 extends entirely through the machine and carries a second cover plate lever 169 on the left side, which is operatively connected by a link 170 to the cover plate bar 176. The lever 46 is provided with a cam slot 48 in which a cam follower 49 rides. The cam follower 49 is carried on one extremity of a plunger lever 50 which is pivoted at 51. Its opposite extremity is connected to a coin plunger 52 slidably mounted within the coin channel 42.

The cover plate lever 46 can be moved forwardly but a limited distance until there is a coin in position in the coin channel 42 since a projection 54 thereon will engage an extremity 55 on the locking lever 44. This distance, although not sufficient to uncover the aperture plate 26, is sufficient to allow the quick-acting lower end of the cam slot 48 to actuate the plunger lever 50 to cause the coin plunger 52 to force the coin past the coin stop 43. Should the coin be of the proper diameter, it will, in passing, lift the locking lever 44 against the action of a spring 53 causing the extremity 55 to move out of the path of the projection 54. This allows the cover plate to be moved, by means of the handle 45, from over the aperture plate 26 for the insertion of written matter on the duplicate paper 18. Should there be no coin in the channel 42, however, or should the coin not be of the proper size, the extremity 55 will remain in the path of the projection 54 and prevent further movement of the plate handle 45 so that it will be impossible to write on the duplicate paper.

As the locking lever 44 is moved upwardly by the coin, a projecting key 56 thereon will lift from a notch in a ratchet wheel 57 carried on the operating pinion 60. This unlocks the operating shaft so that it may be rotated by means of the handle 35. When the locking lever has been rotated to the unlocked position, a retainer 58, actuated by a spring 59, will pass under its free extremity so as to hold it in the unlocked position until the operation of the machine has been completed.

A ratchet pawl 65, loosely carried on the lever shaft 47, is actuated by means of a spring 66 to engage the ratchet wheel 57 to prevent any movement of the operating pinion 60 in other than a clock-wise direction.

A counter shaft 62 passes through the machine and carries counter pinions 61 at each of its extremities. One of these pinions is engaged by the operating pinion 60 adjacent the side plate 38. Each of the pinions 61 engages a large gear 63. The large gears 63 are carried on the extremities of a gear shaft 64 on opposite sides of the machine.

On the right extremity of the gear shaft 64 an intermittent gear 66 is keyed and arranged to impart an intermittent rotation to an intermittent pinion 67 which operates a shaft 92 carrying the paper drive roller 15. On the gear shaft 64, between the side frames 38 and 39, impression cams 68 are secured so as to swing a forked cam follower 69, pivoted on a lever shaft 70, through the medium of cam follower rollers 71. The operation of the cams 68 is shown in detail in Fig. 5. One extremity of the cam follower 69, engages in a notch 72 in an impression roll track support 73 which supports an impression roll track 74 through the medium of resilient springs 75. The track 74 is loosely held in position by means of cross rods 174 which fit loosely within notches in the bottom of the track.

The impression roll track support is carried eccentrically on eccentric shafts 76. Bearing wheels 77 on the impression roll 28 are arranged to carry the roll along the track 74.

After the desired written matter has been added through the aperture plate, the handle 35 is rotated to turn the gear shaft 64 in a clock-wise direction. This first acts to cause the cams 68 to swing the cam follower 69 rearwardly, and force the impression roll track support 73 rearwardly. This causes the eccentric shafts 76 to rotate and raise the track 74 so as to press the impression roll 28 against the paper 10; the paper against the inking ribbon 22; and the ribbon against the dating wheels and number dies. Further rotation of the gear shaft 64 swings impression roll levers 78, carried at each side of the machine from a common lever shaft 70, rearwardly through the medium of connecting links 80. Each impression roll lever 78 is connected by means of a connecting rod 81 to each extremity of the shaft of the impression roll 28. Each side frame is cut away as shown at 165 to allow the extremities of the impression roll shaft to connect with the links 81.

As the levers 78 swing rearwardly the impression roll 28 is caused to travel rearwardly on its track 74 and roll the paper and ink ribbon against the type plate 12. This imprints the type matter through the ribbon to the paper 10.

It is desired to call attention to the fact that the policy form being printed by the type plate is not the one upon which the written matter was inserted through the aperture plate 26. The one upon which the written matter was inserted was printed during the previous operation of the machine.

When the impression roll 28 has reached the limit of its travel, the impression cams 68 will swing the cam follower 69 back to its original position allowing the impression roll track to lower so that the impression roll is out of contact with the paper 10 during the return stroke, and the ribbon, paper and type plate are out of contact with each other.

The intermittent gear 66 will now engage the teeth of the intermittent pinion 67, causing the latter to rotate the driving roll 15 so as to pull the paper 10 through the machine. As the pinion 67 begins to rotate, a locking pin 82 carried thereby will engage an overhung extremity 83 on the plate lever 46 and force the plate lever 46, the cover plate 27, the pusher lever 50, and the plunger 52 to their original positions. This return to the original position is assisted by a spring 84 arranged to press a follower 85 against the plate lever 46. As the final end of paper exits from the machine the locking pin 82, will engage the retainer 58 and force it rearwardly out of engagement with the locking lever 44, allowing the locking lever to again lock the operating shaft, by means of the key 56, and the extremity 55 to again lock the plate lever 46 to prevent access to the aperture plate.

A projection 117 on the left impression cam 68 is arranged to engage a bell ringing lever 118 to force a pivoted clapper 119 away from a bell 120. As the final extremity of the policy issues and the mechanism is restored to its former locked condition, the projection 117 will allow a bell spring 175 to snap the bell lever against a stop 121 causing the clapper 119 to swing outwardly and strike the bell, thus giving the operator an indication that the operation has been completed and his policy is ready to be severed from the machine. The machine is now ready for a subsequent operation.

A portion of the coin channel 42 is exposed through a window 86 and the coins are retained in this channel by means of a spring coin retainer 87 so that the last few coins deposited in the machine are exposed to the exterior. In this way spurious coins may be visibly detected. As each additional coin is added to the coin channel the coin in the channel extremity will be forced past the retainer 87 so that it will fall through an opening 88 into a coin chute 89. The chute 89 passes through the side frame 38 and deposits the coins in a money drawer 90, Fig. 13, locked by any desirable lock 91.

On the left extremity of the main driving roll shaft 92, a driving sprocket 93 is carried which rotates a serial number sprocket 94 and a duplicate paper driving sprocket 95 through the medium of a chain 96. The sprocket 95 is carried on the extremity of a shaft 106 of the duplicate driving roll 20 so that the duplicate driving roll 20 will operate synchronously with the main driving roll 15.

It is desired to call attention to the fact that the main driving roll is of greater diameter than the duplicate driving roll 20. This is intended so that with each operation of the machine the duplicate paper will travel but a fraction of the distance that the main paper 10 travels. It is not desired to keep a duplicate of the entire printed matter and since only that matter written in the aperture plate 26 is carried by the duplicate paper it is not necessary that it travel through the machine at the same speed as the main paper 10. A very much smaller quantity of the duplicate paper 18 is therefore required than the main paper 10. The main paper 10 is kept under the proper tension by means of a brake 97 actuated by a coil spring 99. The duplicate paper is similarly restrained by means of a similar brake 98 actuated by a similar spring 100.

With each operation of the machine it is, of course, necessary to impart travel to the inking ribbon 22 to prevent its becoming worn by continued use in one spot. This is accomplished through the medium of a sliding bar 101 carried from the frame 39 on pins 102 engaged through slotted openings 103. The bar 101 is provided with tongues which engage opposite sides of a ribbon operating cam 105 (an eccentric hub on the sprocket 95) carried on the duplicate driving shaft 106. The cam 105 imparts a horizontal reciprocatory motion to the bar 101. Pivoted at 107 on the bar 101 is a ribbon operating lever 108 which, through the medium of a pawl 109, actuates a ribbon ratchet wheel 110 secured to the ribbon reel 25. A retaining pawl 111 prevents rearward rotation of the ratchet wheel 110. The ribbon lever 108 is provided with a floating fulcrum 112 which rides in a slot 113 in the ribbon lever. The fulcrum 112 is carried on the extremity of a fulcrum lever 114 secured to a fulcrum shaft 115. The floating fulcrum is controlled by means of a ribbon finger 116 which rides upon the ribbon reel and, as the diameter of the roll increases, rotates the fulcrum shaft 115 to raise the floating fulcrum 112. Thus, as the diameter of the receiving roll increases the stroke of the operating extremity of the fulcrum lever will decrease so that the pawl 109 will include a lesser number of teeth. This arrangement is designed to cause the ribbon 22 to move uniformly through the machine regardless of the diameter of its winding roll.

The year, date, month and hour wheels each have a corresponding sight drum geared to them which exposes the year, date, month and hour in a window 122 on the front of the machine so that the operator may see the matter that will be printed on the next policy. For instance the month wheel 32, the date wheel 33, the hour wheel 31 and the year wheel 30 each have corresponding sight drums 32', 33', 31', and 30', respectively in mesh with them and arranged to expose a positive of the indication which is at the bottom of the wheels through the window 122. The serial number wheels 34 are driven from timing gears 34' which are carried on a shaft 123 rotated by the serial number sprocket 94 from the chain 96.

The hour wheel 31 and the date wheel 33 are operated from a clock mechanism 124 of any of the usual clock-work designs. In adapting the clock to operate these wheels, a time cam 125 is secured to the minute hand sleeve 126 of the clock. This cam acts to raise a time lever 127 during an hourly revolution and allow the lever to drop at the end of each hour. The lever 127 supports, through the medium of a link 128, a pawl arm 129 (see Fig. 14) which rotates the time wheel 31 through the medium of a gravity pawl 130. A weight 131 is pivoted at 132 adjacent the clock and connects through a lever 133 and a link 134 with the pawl arm 129. As the cam 125 makes its revolution the pawl arm and weight 131 will gradually rise. At the end of the hour the cam will allow the weight 131 to force the pawl arm downwardly carrying the time wheel 31 forward one tooth in circumference. There are twenty four teeth in the ratchet 135 corresponding to the hours of the day so that in twenty four hours the time wheel 31 will make one complete revolution. A check pawl 136 carried on a pivot 137 which also supports the pawl arm 129 prevents the time wheel from returning and stops it and holds it in the proper position. This stop pawl is actuated by means of a weight 138. As the ratchet is being forced forwardly a projection 139 on the pawl arm will engage the forward face of that tooth directly in front of the check pawl 136 to prevent the ratchet from being overthrown.

The ratchet 135 and the time wheel 31 are secured on a rotatable sleeve on a common shaft 140. To this sleeve is secured a date cam 141 (see Fig. 15) which operates the date wheel 33. Each twenty four hours the cam 141 will make one revolution and will raise, through the medium of a cam follower 142, a date pawl arm 143. The arm 143 operates a ratchet wheel 144, connected with the date wheel 33, through the medium of a pawl 145. A connecting link 149 connects, through the medium of a second weight lever 148, the pawl arm 143 with a weight 146 which is carried on a hinge pin 147, similarly to the weight 131. It is the weight 146 which forces the date wheel 32 to its new position. The wheel is caused to be maintained in predetermined positions by a stop pawl 150, similar to the stop pawl 136.

The year wheel 30 with its indicating drum 30' is shown in detail in Fig. 16, the drum 30' being carried on a gear 151 which meshes with a gear 152 carried by the year wheel. A spring click 153 engages the teeth of the gear 151 to maintain the year wheel in any position in which it is set. This wheel does not operate automatically. The month wheel is also set by hand.

All of the parts of the machine are easily accessible and removable without disturbing the supporting structure. The ribbon reel 23 for instance is carried in end frames 154 which also carry a braking spring 155. The frames 154 rest upon a cross rod 157 and a hinge rod which supports a ribbon guard plate 156 over which the duplicate paper slides. To remove the ribbon it is only necessary to throw the cover plate 27 back to the broken line position "A", Fig. 10 and lift the ribbon reel from its position.

Either of the rubber pressure rolls 16 and 21 may be easily removed through the side frames 38 or 39 by removing a plug 158 which is held in place in the side frame by a clamp screw 159. There is a plug 158 at each end of each roll. The roll shafts are carried in sliding bearings 160 in the plugs 158. The plugs contain springs 161 to force the roll against the paper.

The eccentric shafts 76 may be easily removed by removing a clamp screw 163 and dismounting a cap 162 from one of the side frames. The paper reels are carried in U-shaped frames 173 carried in slides 164 from which they may be easily removed through the ends of the machine.

The type plate 12 is easily removed through the rear end of the machine since it is attached to the backing plate 167 which is slidably held in place in guides 184 on the side frames 38 and 39 (see Fig. 18). The ribbon winding reel can be readily removed since it is clamped in place between the bearing of the ratchet wheel 110 and a bearing stud 180. The bearing stud 180 is maintained in engagement with the reel by means of a retaining ball 181 which rides in a suitable peripheral groove on the stud. The ball is maintained in the groove by a spring 183, the entire mechanism being carried in a bearing housing 182. To remove the reel it is only necessary to force the stud 180 outwardly causing the ball 181 to leave its groove.

It is essential that the clock and time wheels be maintained in accurate position relative to each other and to the strip 10. This is accomplished by carrying the entire mechanism on a unit clock frame 166 which is carried on the common shaft 140 and a cross rod 177, which are both secured at their extremities in the side frames. The driving rolls 15 and 20 and the pressure rolls 16 and 21 are preferably formed with sectional treads, that is, the rolls do not engage the paper throughout its width, only sufficient engagement being provided to give the proper frictional pull upon the paper. This prevents blurring of the fresh, offset ink matter on the policy.

Access may be had to the time wheels, clock and stored duplicate paper strip above the sub-floor 168 by raising a lid 79 which is hinged to the housing 9 at 179 and locked by any suitable lock 171. The lid 79 is provided with suitable openings 178 which correspond with the openings 185 in the aperture plate and through which the written matter is inserted.

While a specific form of the improvement has been described and illustrated herein, it is desired to be understood that the same may be varied, within the scope of the appended claims, without departing from the spirit of the invention.

Having thus described the invention, what I claim and desire to secure by Letters Patent is:—

1. A machine for printing and issuing printed forms comprising means for causing a strip of paper to travel through said machine at intervals; a type plate; an offsetting medium between said type plate and said strip so as to print the impression of said type plate on said strip; an impression roll adapted to impress said strip and offsetting medium against said type plate; and tracks to carry said impression roll, the distance between said tracks and said printing plate being variable so that said impression roll will contact said strip with said plate when moving in one direction and release said strip from said plate when moving in the opposite direction.

2. A machine for printing and issuing printed forms comprising means for causing a strip of paper to travel through said machine at intervals; a type plate; an offsetting medium between said type plate and said strip so as to print the impression of said type plate on said strip; a second strip adapted to pass over a portion of said first strip and over said offsetting medium; and means for removing one of said strips from the line of travel so as to allow said type plate to contact with said offsetting medium.

3. A machine for printing and issuing printed forms comprising means for causing a strip of paper to travel through said machine at intervals; a type plate; an offsetting medium between said type plate and said strip so as to print the impression of said type plate on said strip; an impression roll adapted to impress said strip and offsetting medium against said type plate; tracks arranged to support said impression roll; and resilient means for supporting said tracks so as to allow said impression roll to yieldably contact with said type plate.

4. A machine for printing and issuing printed forms comprising means for causing a strip of paper to travel through said machine at intervals; a type plate; an offsetting medium between said type plate and said strip so as to print the impression of said type plate on said strip; an impression roll adapted to impress said strip and offsetting medium against said type plate; tracks arranged to support said impression roll; and a cam operatively connected with said track so as to maintain said impression roll against said type plate as it moves in one direction and away from said plate as it moves in the opposite direction.

5. A machine for printing and issuing printed forms comprising means for causing a strip of paper to travel through said machine at intervals; a type plate; an offsetting medium between said type plate and said strip so as to print the impression of said type plate on said strip; an impression roll adapted to impress said strip and offsetting medium against said type plate; tracks arranged to support said impression roll; eccentric bearings supporting said tracks; and means for moving said tracks longitudinally so as to cause said eccentric bearings to move said track vertically so as to maintain said impression roll against said type plate as it moves in one direction and away from said plate as it moves in the opposite direction.

6. A machine for printing and issuing printed forms comprising means for causing a strip of paper to travel through said machine at intervals; a type plate; an offsetting medium between said type plate and said strip so as to print the impression of said type plate on said strip; an impression roll adapted to impress said strip and offsetting medium against said type plate; tracks arranged to support said impression roll; eccentric bearings supporting said tracks; and means for moving said tracks longitudinally so as to cause said eccentric bearings to move said track vertically so as to maintain said impression roll against said type plate as it moves in one direction and away from said plate as it moves in the opposite direction, said means comprising a cam and a follower for said cam, said follower being pivoted at its lower extremity below said cam and engaging said track at its upper extremity.

7. A machine for printing and issuing printed forms comprising means for causing a strip of paper to travel through said machine at intervals; a type plate; an offsetting medium between said type plate and said strip so as to print the impression of said type plate on said strip; an impression roll adapted to impress said strip and offsetting medium against said type plate; tracks arranged to support said impression roll; eccentric bearings supporting said tracks; means for moving said tracks longitudinally so as to cause said eccentric bearings to move said track vertically so as to maintain said impression roll against said type plate as it moves in one direction and away from said plate as it moves in the opposite direction, said means comprising a cam and a follower for said cam, said follower being pivoted at its lower extremity below said cam and engaging said track at its upper extremity; and means operable by said cam to give an audible indication when said impression roll has returned to its starting position.

8. A machine for printing and issuing printed forms comprising means for causing a strip of paper to travel a predetermined amount through said machine; a stationary type plate; an offsetting medium arranged between said type plate and said strip; an impression roll arranged to compress said offsetting medium between said type plate and said strip; means for causing said impression roll to travel across said type plate; means for forcing said impression roll toward said type plate, said latter means comprising a track supporting said impression roll; eccentric shafts supporting said track so that longitudinal movement of the latter will cause a vertical movement; and a cam arranged to cause longitudinal movement of said track.

9. A machine for printing and issuing printed forms comprising means for causing a strip of paper to travel a predetermined amount through said machine; a stationary type plate; an offsetting medium arranged between said type plate and said strip; an impression roll arranged to compress said offsetting medium between said type plate and said strip; means for causing said impression roll to travel across said type plate; means for forcing said impression roll toward said type plate, said latter means comprising a track supporting said impression roll; eccentric shafts supporting said track so that longitudinal movement of the latter will cause a vertical movement; a cam arranged to cause longitudinal movement of said track; and a projection carried by said cam adapted to engage a bell ringing lever and to release said lever to contact with said bell when said cam has returned to its starting position.

10. In a machine for issuing a printed form from a continuous strip of paper comprising a first driving roll arranged to impart motion to said strip; a second driving roll arranged to impart motion to a duplicate strip; and a reel arranged to impart motion to an offsetting medium arranged to travel between said first strip and said duplicate strip, said first and second driving rolls and said reel being arranged to operate in unison but at differing speeds; and numbering wheels arranged to contact with said duplicate paper and offset their characters through said offsetting medium to said first strip, said numbering wheels being operated from the said first driving roll.

In testimony whereof, I affix my signature.

CLEVELAND W. COLE.